United States Patent
Nambu et al.

(10) Patent No.: US 9,513,430 B2
(45) Date of Patent: Dec. 6, 2016

(54) PLANAR LIGHT SOURCE APPARATUS HAVING PROJECTION PORTIONS

(71) Applicant: OMRON Corporation, Kyoto-shi, Kyoto (JP)

(72) Inventors: Kensuke Nambu, Saitama (JP); Koichi Takemura, Saitama (JP)

(73) Assignee: OMRON Corporation, Kyoto (JP)

(*) Notice: Subject to any disclaimer, the term of this patent is extended or adjusted under 35 U.S.C. 154(b) by 148 days.

(21) Appl. No.: 14/600,963

(22) Filed: Jan. 20, 2015

(65) Prior Publication Data
US 2015/0260909 A1    Sep. 17, 2015

(30) Foreign Application Priority Data

Mar. 13, 2014   (JP) ................................. 2014-050891

(51) Int. Cl.
*F21V 7/04* (2006.01)
*F21V 8/00* (2006.01)

(52) U.S. Cl.
CPC ........... *G02B 6/0091* (2013.01); *G02B 6/0068* (2013.01)

(58) Field of Classification Search
CPC  G02B 6/0091; G02B 6/0068; G02B 6/0095; G02F 1/13308; G02F 2001/133314; G02F 2001/133317; G02F 1/3332; G02F 1/33328; F21Y 2101/02
USPC ............ 362/97.1, 97.2, 97.3, 613, 633, 632, 362/634
See application file for complete search history.

(56) References Cited

U.S. PATENT DOCUMENTS

| | | | | |
|---|---|---|---|---|
| 2007/0165421 A1* | 7/2007 | Sakai | ..................... | G02B 6/009 362/612 |
| 2009/0237596 A1* | 9/2009 | Park | ..................... | G02B 6/0091 349/69 |
| 2011/0194049 A1* | 8/2011 | Kim | ..................... | G02B 6/0091 349/64 |
| 2014/0368767 A1* | 12/2014 | Sugawara | ............ | G02B 6/0031 349/62 |

FOREIGN PATENT DOCUMENTS

JP           2005-259374 A          9/2005

* cited by examiner

*Primary Examiner* — Anh Mai
*Assistant Examiner* — Glenn Zimmerman
(74) *Attorney, Agent, or Firm* — Osha Liang LLP

(57) ABSTRACT

A planar light source apparatus has a light guide plate, a light source arranged on a side face of the light guide plate, a mounting substrate on which the light source is mounted, and a frame body that holds the light guide plate. The frame body has a plurality of projection portions on an inner side of the frame body. The light source is arranged between the projection portions. The frame body, the mounting substrate, and the light guide plate are fixed via a fixing member. The light source has a pair of electrode terminals. The mounting substrate has a land portion on which the electrode terminals are mounted. Connection portions are provided by which the electrode terminals and the land portion are electrically connected. The projection portions have a thickness defined by a surface on the mounting substrate side and an opposite surface relative thereto.

20 Claims, 10 Drawing Sheets

PLANAR LIGHT SOURCE APPARATUS HAVING PROJECTION PORTIONS

BACKGROUND

Field

The present invention relates to a planar light source apparatus, and in particular relates to a side light type of planar light source apparatus in which light sources are disposed to the side of a light guide plate.

Related Art

One example of a conventional planar light source apparatus has light sources, a mounting substrate on which the light sources are mounted, a light guide plate in which light emitted from the light sources enters a light entrance face and exits from a light exit face that is adjacent to the light entrance face, and a frame that supports the light guide plate. The mounting substrate having the light sources mounted thereon is arranged on the light guide plate in a state in which the light sources are fitted into recessed portions provided in the frame (e.g., see JP 2005-259374A).

JP 2005-259374A is an example of related art.

SUMMARY

The following describes this conventional planar light source apparatus with reference to FIGS. 10A and 10B. FIGS. 10A and 10B show a conventional side light type of planar light source apparatus 120. As shown in FIG. 10A, a frame 121 that supports a light guide plate 111 is frame-shaped (specifically, shaped as a picture frame having a hollow rectangular central portion), and the light guide plate 111 is arranged within the frame 121. The frame 121 is provided with recessed portions 126 to 128 for accommodating light sources 112 to 114. When the light sources 112 to 114 are arranged by being fitted into the recessed portions 126 to 128, the light guide plate 111 and the light sources 112 to 114 are arranged in a state of being adjacent to each other in the frame 121, and the light sources 112 to 114 are arranged such that light emission faces 112a to 114a thereof oppose a light entrance face 111c of the light guide plate 111. Here, as shown in FIG. 10B, projection portions 122 to 125 of the frame 121, the mounting substrate 115 having the light sources 112 to 114 mounted thereon, and the light guide plate 111 are fixed via a comb-shaped fixing member 130 having two adhesive surfaces.

There is demand for further improvement in the viewability of display screens in display apparatuses such as liquid crystal display apparatuses. There has been demand for increased brightness in the planar light source apparatuses used in such display apparatuses. Conventionally, since there has also been demand for reduced power consumption in planar light source apparatuses, improvements have mainly been made with focus on how much the brightness can be improved while minimizing the number of light sources. However, in recent years, demand for reduced power consumption has become lower than in the past due to an increase in the battery capacity of electronic devices themselves, charging environment improvements, and the like. It has become possible to select a method of increasing the brightness by shrinking the pitch of the light sources installed in the planar light source apparatus, and installing more light sources so as to increase the quantity of light.

When attempting to shrink the pitch of the light sources installed in a planar light source apparatus, the pitch between the terminals of adjacent light sources shrinks. However, in a planar light source apparatus having the structure shown in FIG. 10, the projection portions 122 to 125 of the frame 121 exist between the light sources. If the width of the projection portions 122 to 125 is reduced as much as possible, the pitch between the light sources can be shrunk as well, but if the area of the projection portions 122 to 125 is too small, there is a decrease in the fixing area of the fixing member 130 that fixes the projection portions 122 to 125 of the frame 121, the mounting substrate 115 having the light sources 112 to 114 mounted thereon, and the light guide plate 111, and the fixing strength of the planar light source apparatus becomes insufficient. Accordingly, it has not been easy to shrink the pitch between the light sources.

One or more embodiments of the present invention provides a planar light source apparatus in which multiple light sources that are to be connected on the mounting substrate can be mounted with a narrower pitch.

A planar light source apparatus according to one or more embodiments of the present invention includes: a light guide plate; a light source arranged on a side face of the light guide plate; a mounting substrate on which the light source is mounted; and a frame body that holds the light guide plate. The frame body has a plurality of projection portions on an inner side of the frame body, the light source is arranged between the projection portions, and the frame body, the mounting substrate, and the light guide plate are fixed via a fixing member. The light source has a pair of electrode terminals, the mounting substrate has a land portion on which the electrode terminals are mounted, and connection portions are provided by which the electrode terminals and the land portion are electrically connected. The projection portions have a thickness defined by a surface on the mounting substrate side and an opposite surface relative thereto, and each of the projection portions is formed such that, in a cross-section of at least a portion of the projection portion viewed in a projecting direction of the projection portion in a vicinity of the connection portions, the height or the width of the projection portion is smaller than the highest height or the highest width of the projection portion from the surface of the projection portion on the mounting substrate side toward the opposite surface. According to the planar light source apparatus of one or more embodiments of the present invention, each of the projection portions are formed such that, in a cross-section of at least a portion of the projection portion as viewed in the projecting direction of the projection portion, the height or the width of the projection portion is smaller than the highest height or the highest width of the projection portion from the surface of the projection portion on the mounting substrate side. Accordingly, the connection portions for connecting the electrode terminals of the light sources and the land portion of the mounting substrate can be accommodated in the formed holes, and the pitch between the light sources can be shrunk, thus making it possible to mount a larger number of light sources in a planar light source apparatus having a certain width.

In a planar light source apparatus according to one or more embodiments of the present invention, a plurality of the light sources are provided, and in each of the projection portions located between the connection portions, the width of the surface that comes into contact with the substrate via the fixing member is the smallest in the projection portion. According to this configuration, the width of the frame at the tip of each of the projection portions is larger than the width of the portion in which the holes are provided, thus making it possible to increase the area of the surface of the projection portion that comes into contact with the substrate via the fixing member, and therefore the fixing strength of the planar light source apparatus is raised.

In a planar light source apparatus according to one or more embodiments of the present invention, each of the projection portions is formed such that, in a cross-section of at least a portion of the projection portion viewed in the projecting direction of the projection portion, only the width of the projection portion is smaller than the highest width of the projection portion. According to this configuration, the connection portions for connecting the electrode terminals of the light sources and the land portion of the mounting substrate can be accommodated in the holes formed in this way, and the pitch between the light sources can be shrunk, thus making it possible to mount a larger number of light sources in a planar light source apparatus having a certain width. Also, by forming the holes for accommodating the connection portions so as to pass completely through, it is possible to check the arrangement relationship from the outside during assembly of the planar light source apparatus.

In a planar light source apparatus according to one or more embodiments of the present invention, tips of the projection portions and the light guide plate oppose each other, and each of the projection portions is formed such that the width of a cross-section of the tip of the projection portion is larger than the cross-section of at least a portion of the projection portion as viewed in the projecting direction of the projection portion in which the height or the width of the projection portion is smaller than the highest width of the projection portion from the surface of the projection portion on the mounting substrate side. According to this configuration of the planar light source apparatus of one or more embodiments of the present invention, the connection portions for connecting the electrode terminals of the light sources and the land portion of the mounting substrate are accommodated in the holes formed in at least a portion of the projection portions of the frame body, and therefore it is possible to shrink the pitch between the light sources, thus making it possible to mount a larger number of light sources in a planar light source apparatus having a certain width. Also, the width of the frame at the tip of each of the projection portions is larger than the width of the portion in which the holes are provided, thus making it possible to increase the area of the surface of the projection portion that comes into contact with the substrate via the fixing member, and therefore the fixing strength of the planar light source apparatus is raised.

In a planar light source apparatus according to one or more embodiments of the present invention, the height or the width of the projection portion at the tip of the projection portion is smaller than the highest height or the highest width of the projection portion from the surface of the projection portion on the mounting substrate side. According to this configuration of the planar light source apparatus of one or more embodiments of the present invention, a level difference is formed in the projection portions on the flexible printed circuit board side. The level difference is formed so as to be continuous from the vicinity of the connection portion of the flexible printed circuit board toward the tip side of the projection portion, and therefore the connection portion for connecting the electrode terminals of the light source and the land portion of the mounting substrate can be accommodated in the level difference, and the pitch between the light sources can be shrunk, thus making it possible to mount a larger number of light sources in a planar light source apparatus having a certain width.

In a planar light source apparatus according to one or more embodiments of the present invention, as viewed in the projecting direction of the projection portions, at least a portion of a cross-sectional shape of the projection portions is "T" shaped. According to this configuration of the planar light source apparatus of one or more embodiments of the present invention, the cross-section of the projection portions provided with the holes for accommodating the connection portions for connecting the electrode terminals of the light sources and the land portion of the mounting substrate is "T" shaped, thus making it possible to shrink the pitch between the light sources. Also, according to this shape, the projection portions can be easily processed, and the space for accommodating the connection portions can be formed easily.

In a planar light source apparatus according to one or more embodiments of the present invention, as viewed in the projecting direction of the projection portions, at least a portion of a cross-sectional shape of the projection portions is trapezoidal. According to this configuration of the planar light source apparatus of one or more embodiments of the present invention, the cross-section of the projection portions provided with the holes for accommodating the connection portions for connecting the electrode terminals of the light sources and the land portion of the mounting substrate is trapezoidal, thus making it possible to shrink the pitch between the light sources.

In a planar light source apparatus according to one or more embodiments of the present invention, as viewed in the projecting direction of the projection portions, a portion of the contour of a cross-sectional shape of the projection portions includes a curved line. According to this configuration of the planar light source apparatus of one or more embodiments of the present invention, a portion of the cross-sectional shape of the projection portions provided with the holes for accommodating the connection portions for connecting the electrode terminals of the light sources and the land portion of the mounting substrate includes a curved surface, thus making it possible to shrink the pitch between the light sources.

In a planar light source apparatus according to one or more embodiments of the present invention, tips of the projection portions and the light guide plate oppose each other, the fixing member is arranged so as to span the projection portions and the light guide plate, and the thickness of the projection portions and the thickness of the light guide plate are the same thickness at the opposing surfaces. According to this configuration of the planar light source apparatus of one or more embodiments of the present invention, the surfaces of the projection portions and the light guide plate that come into contact have the same thickness, thus making it possible to arrange the fixing member precisely and further raise the fixing strength.

In a planar light source apparatus according to one or more embodiments of the present invention, the area of each of the projection portions on the mounting substrate side is smaller than the area of the opposite surface relative thereto. According to the planar light source apparatus of one or more embodiments of the present invention, the connection portions for connecting the electrode terminals of the light sources and the land portion of the mounting substrate can be accommodated in the holes formed in the projection portion on the mounting substrate side, and the pitch between the light sources can be shrunk, thus making it possible to mount a larger number of light sources in a planar light source apparatus having a certain width.

In a planar light source apparatus according to one or more embodiments of the present invention, the area of the shape of portions of the fixing member arranged over the projection portions is smaller than or equal to the area of the projection portions. According to the planar light source apparatus of one or more embodiments of the present invention, the shape of the fixing member is formed so as to conform to the shape of the projection portions and have an area smaller than or equal to the projection portions, thus making it possible to maximize the fixing strength without impairing the electrical connection in the connection portions.

A display apparatus according to one or more embodiments of the present invention includes a planar light source apparatus according to one or more embodiments of the present invention and a display apparatus. Since this display apparatus uses a planar light source apparatus of one or more embodiments of the present invention, it may be possible to raise the brightness of the liquid crystal display apparatus and provide a display apparatus having excellent display quality.

An electronic device according to one or more embodiments of the present invention includes a planar light source apparatus according to one or more embodiments of the present invention and a display apparatus. Since this electronic device includes a display apparatus that uses the planar light source apparatus of one or more embodiments of the present invention, it may be possible to provide an electronic device that includes a display apparatus having excellent display quality.

Combinations of the above-described constituent elements are within the scope of the invention, and many variations of embodiments of the present invention are possible according to the combination of the constituent elements.

According to one or more embodiments of the present invention, it may be possible for multiple light sources that are to be connected on a mounting substrate to be mounted with a narrower pitch in a planar light source apparatus.

DETAILED DESCRIPTION

Embodiments of the present invention will be described in detail below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiment 1

Figure 1:
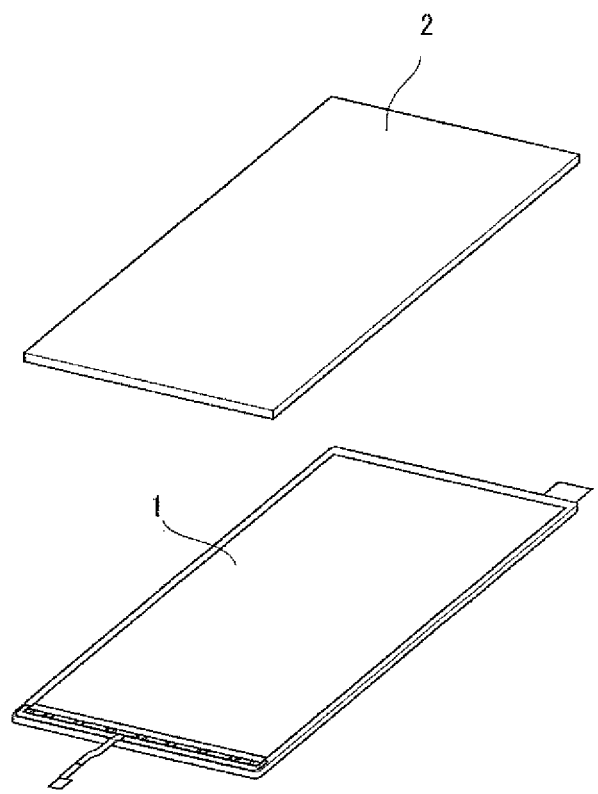
FIG. 1 is an exploded perspective view of a planar light source apparatus and a liquid crystal panel according to Embodiment 1 of the present invention.
Figure 2:
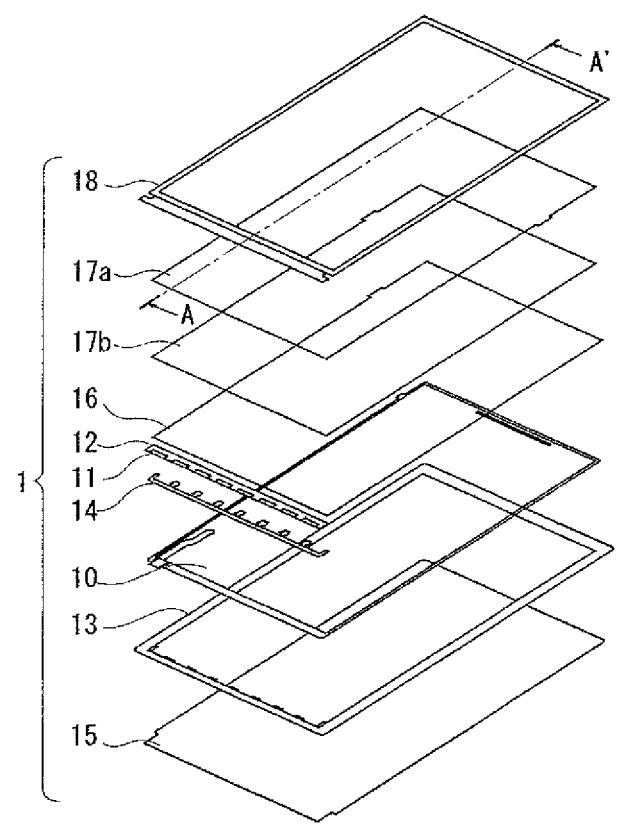
FIG. 2 is an exploded perspective view of the planar light source apparatus according to Embodiment 1 of the present invention.
Figure 3:
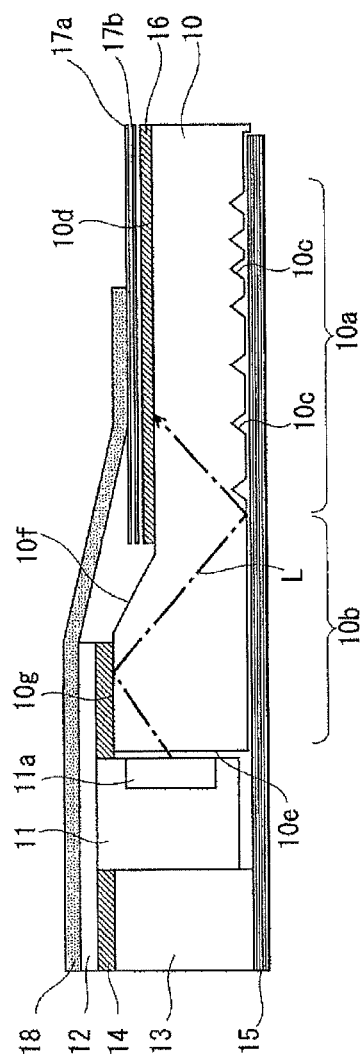
FIG. 3 is a cross-sectional view of the planar light source apparatus according to Embodiment 1 of the present invention, taken along a line A-A'.
Figure 4A:
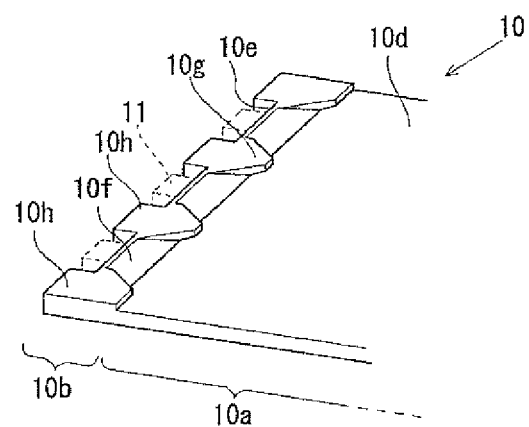
FIGS. 4A and 4B are perspective views of a light guide plate and light sources according to Embodiment 1 of the present invention.
Figure 4B:
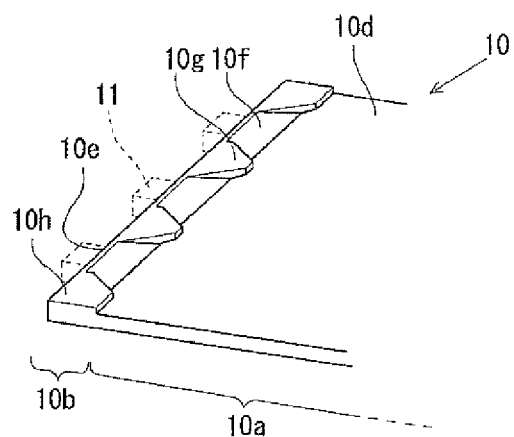

FIG. 1 is an exploded perspective view of a liquid crystal display apparatus, and FIG. 2 is an exploded perspective view of a planar light source apparatus. FIG. 3 is a cross-sectional view of the planar light source apparatus in FIG. 2 taken along a line A-A' at a position that includes a later-described light source, and FIGS. 4A and 4B are perspective views of enlarged portions of a light guide plate in FIG. 2.

As shown in FIG. 1, the liquid crystal display apparatus of Embodiment 1 has a liquid crystal panel 2 and a planar light source apparatus 1 arranged rearward of the liquid crystal panel. Although the planar light source apparatus 1 is described as a backlight unit in Embodiment 1, it can also be used as a front light arranged in front of a display apparatus utilizing electronic paper or a liquid crystal panel.

As shown in FIG. 2, the planar light source apparatus 1 of Embodiment 1 is constituted by a light guide plate 10, light sources 11, a flexible printed circuit board (wiring substrate) 12, a frame (frame body) 13, a fixing member 14, a reflection sheet 15, a diffusion sheet 16, prism sheets 17a and 17b, and a light shielding sheet 18.

In the description of the planar light source apparatus 1 and the light guide plate 10 of Embodiment 1, the surface on the liquid crystal panel side is the upper surface, and the surface opposite thereto is the lower surface.

In FIGS. 3A and 3B, the light guide plate 10 of Embodiment 1 is molded from a resin that is translucent and has a high refractive index, such as polycarbonate resin or polymethylmethacrylate (PMMA) resin. The light guide plate 10 includes a light guide plate main body portion 10a that is plate-shaped and has a uniform thickness, and a light introduction portion 10b that is provided in the end portion of the light guide plate main body portion 10a, has wedge-shaped portions, and is thicker than the light guide plate main body portion 10a. Many minute optical shapes 10c are formed in the lower surface of the light guide plate main body portion 10a, and the upper surface of the light guide plate main body portion 10a serves as a light exit face 10d. The light introduction portion 10b has a light entrance face 10e for receiving light from the light sources 11, and an inclined face 10f that is connected to the light guide plate main body portion 10a. The inclined face 10f is inclined toward the upper surface of the light guide plate main body portion 10a.

Also, as shown in FIGS. 4A and 4B, fixing member contact faces 10g for the arrangement of the later-described fixing member 14 are formed in the light introduction portion 10b of the light guide plate 10 at corresponding positions between the light sources 11, and the fixing member contact faces 10g protrude perpendicularly from the light entrance face 10e without an inclination relative to the height of the upper edge of the light entrance face 10e. According to one or more embodiments of the present invention, the fixing member contact faces 10g are shaped so as to not impair the travel of light emitted from the light sources 11 toward the light guide plate main body portion 10a.

In Embodiment 1, the upper surface shape in the same plane as viewed from the light exit face 10d side is approximately trapezoidal so as to not interfere with light emitted from the light sources 11. Also, as shown in FIG. 4A, the light guide plate 10 may have protruding portions 10h that protrude from the light entrance face 10e of the light guide plate 10 at corresponding positions between the light sources 11, the surfaces of the protruding portions 10h on the light exit face 10d side may be formed so as to be approximately coplanar with the fixing member contact faces 10g, and the total thickness of the planar light source apparatus 1 may be reduced by providing recessions that conform to the shape of the fixing member 14.

In FIG. 3, the light sources 11 of Embodiment 1 are each an LED white light source that emits white light from a light emission window 11a. The LED white light sources are cuboid, and the two end surfaces in the lengthwise direction are provided with terminals connected to respective side surfaces. The LED white light sources are mounted on the flexible printed circuit board 12 at constant intervals, and driven in this state. The light sources 11 are arranged such that the light emission windows 11a thereof oppose the light entrance face 10e of the light guide plate 10 with a minute gap therebetween, or in close contact therewith.

Figure 5A:
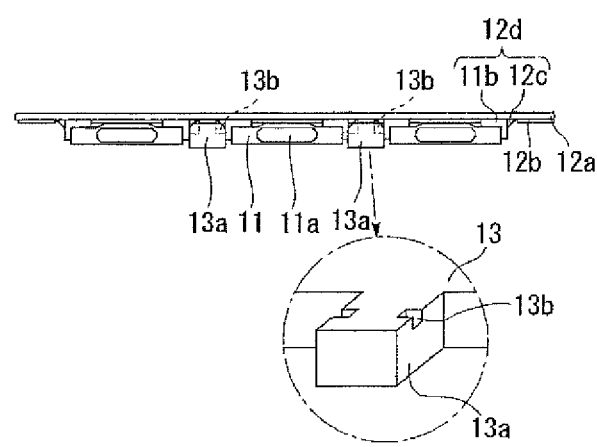
FIG. 5A is a diagram showing the light guide plate, light sources, and a frame according to Embodiment 1 of the present invention, as viewed from within the frame, as well as an enlarged perspective view of the frame.
Figure 5B:
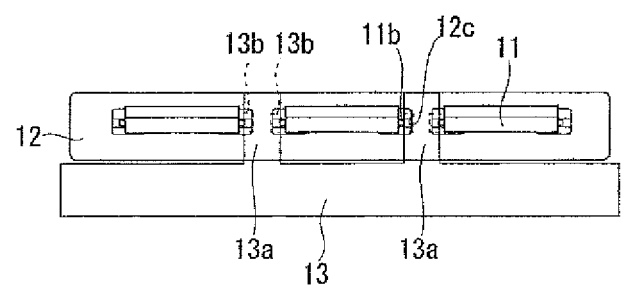
FIG. 5B is a diagram showing a flexible printed circuit board as viewed from below.

FIG. 5A shows the flexible printed circuit board 12, light sources 11, and the frame 13 from within the frame 13, and also includes an enlarged perspective view of the frame 13. FIG. 5B shows the flexible printed circuit board 12 from below.

As shown in FIG. 5A, in the flexible printed circuit board 12 of Embodiment 1, a series circuit for connecting multiple light sources 11 in series is provided. Also, wires (not shown) made of conductive foil, and lands (not shown) are provided on a base material 12a, and a cover lay film 12b for protection is adhered to the surface. The base material 12a and the cover lay film 12b are flexible insulating films. Also, the wiring pattern made of conductive foil is formed by etching or the like. Terminals 11b of the light sources 11 are arranged over the lands and are joined by soldering, and thus connection portions 12d for electrical connection are formed. The connection portions 12d form solder fillets 12c, and have three-dimensionally protruding shapes.

As shown in FIGS. 2 and 3, the frame (frame body) 13 of Embodiment 1 serves to hold the light guide plate 10, the light sources 11, the flexible printed circuit board 12, the fixing member 14, the light shielding sheet 18, and optical sheets such as the reflection sheet 15, the diffusion sheet 16, and the prism sheets 17a and 17b, which are members that constitute the planar light source apparatus 1. The frame 13 is generally obtained by molding white resin, and the inner peripheral surfaces thereof play the role of reflection walls. The frame 13 is shaped as a frame made up of four sides and an opening. Multiple projection portions 13a that project toward the interior of the opening of the frame 13 are formed on the inner surface on the side where the light sources 11 are to be arranged. The light sources 11 are arranged between respective projection portions 13a, and the tips of the projection portions 13a oppose the light entrance face 10e of the light guide plate 10. If the protruding portions 10h are formed on the light entrance face 10e of the light guide plate 10, a configuration is possible in which the thickness of the protruding portions 10h is set to half the thickness of the light guide plate 10, and the thickness of the projection portions 13a is adjusted so as to fit with the protruding portions 10h of the light guide plate 10 whose thickness was halved, such that the protruding portions 10h of the light guide plate 10 and the projection portions 13a fit together and overlap each other.

As shown in FIG. 5A, the thickness of the projection portions 13a is defined by the surface on the flexible printed circuit board 12 side and the opposite surface. In the vicinity of the connection portions 12d for connecting the flexible printed circuit board 12 and the light sources 11, holes 13b are formed in the projection portions 13a such that these portions of the projection portions 13a have a smaller height and width than in the other portions as viewed in the direction of protrusion from the surface of the projection portions 13a on the flexible printed circuit board 12 side. In this portion where the holes 13b are formed, the cross-section of the projection portion 13a itself in a direction perpendicular to the protrusion direction of the projection portion 13a is shaped as a vertically inverted "T". The inner walls of the holes 13b are constituted by multiple surfaces. In this way, the holes 13b are formed in the projection portions 13a such that these portions of the projection portions 13a have a smaller height and width as viewed in the direction of protrusion from the surface of the projection portions 13a on the flexible printed circuit board 12 side, and therefore the connection portions 12d for connecting the flexible printed circuit board 12 and the light sources 11 are accommodated in the holes 13b formed in the projection portions 13a, thus making it possible to shrink the pitch between the light sources 11.

For example, conventionally, in the case of mounting light sources 11 with a width of 3.80 mm, the limit of the pitch between the light sources 11 has been 5.10 mm, but in Embodiment 1, light sources 11 with a width of 3.80 mm can be mounted with a pitch of 4.70 mm, thus making it possible to shrink the pitch between the light sources 11 by 0.40 mm. In this case, if the side surface of the light guide plate 10 provided with the light sources 11 has a length of 61.884 mm, conventionally it has been possible to mount only 12 light sources 11, but with the above configuration, it is possible to mount 13 light sources 11. Increasing the number of light sources 11 by one makes it possible to raise the absolute value of the brightness of the planar light source apparatus 1 by 8.3 percent. Furthermore, since the holes 13b are formed in the vicinity of the connection portions 12d for connecting the flexible printed circuit board 12 and the light sources 11, the thickness of the frame 13 at the tips of the projection portions 13a is approximately the same as the thickness of the light entrance face 10e of the light guide plate 10, thus making it possible to precisely arrange the fixing member 14 and further raise the fixing strength.

Figure 6A:
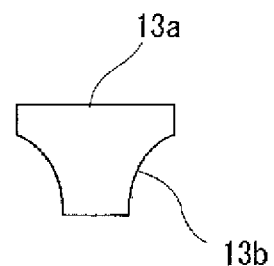
FIGS. 6A to 6C are diagrams showing variations of cross-sectional shapes of a projection portion according to Embodiment 1 of the present invention, the cross-sections being taken along a plane parallel to the light entrance face of the light guide plate.
Figure 6B:
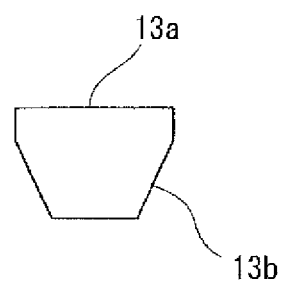
Figure 6C:
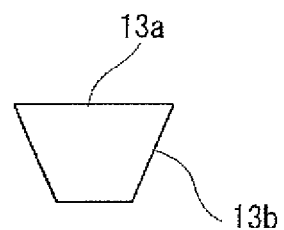

FIGS. 6A to 6C are plan views of variations of the cross-sectional shape of at least a portion of the projection portion 13a in Embodiment 1 of the present invention, taken along a plane parallel to the light entrance face 10e of the light guide plate 10 (a plane viewed in the projecting direction of the projection portion 13a).

There are no particular limitations on the shape of the holes 13b. For example, a configuration is possible in which, as shown in FIG. 6A, the inner wall of the projection portion 13a in which the hole 13b is formed is a curved surface, and the cross-sectional shape of the projection portion 13a itself as viewed in the projecting direction of the projection portion 13a includes an arc in terms of the cross-sectional shape. Also, as shown in FIG. 6B, the cross-sectional shape of the projection portion 13a itself as viewed in the projecting direction of the projection portion 13a may be a pentagon. Moreover, as shown in FIG. 6C, the cross-sectional shape of the projection portion 13a itself as viewed in the projecting direction of the projection portion 13a may be a trapezoid. In any case, the hole 13b formed in the projection portion 13a need only be able to accommodate the connection portion 12d, and the shape of the hole 13b can be appropriately selected from among various shapes. Note that, although in one or more embodiments of the present invention, the connection portion 12d and the inner wall of the hole 13b of the projection portion 13a do not come into contact, they may come into contact.

Figure 7A:
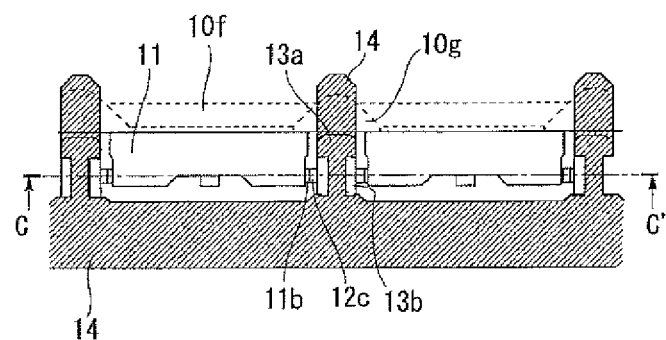
FIG. 7A is a top view of the light guide plate, light sources, the frame, and a fixing member according to Embodiment 1 of the present invention.
Figure 7B:
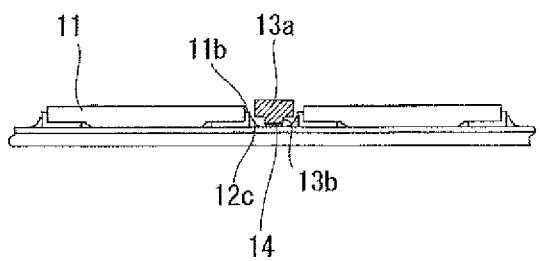
FIG. 7B is a cross-sectional view of the same taken along a line C-C'.

FIG. 7A is a diagram showing the flexible printed circuit board 12, the fixing member 14, a light source 11, and the frame 13 from above, and the positional relationships between these members are shown. FIG. 7B is a cross-sectional view taken along a line C-C' in FIG. 7A.

The fixing member 14 of Embodiment 1 fixes the flexible printed circuit board 12, the frame 13, and the light guide plate 10. Double-sided adhesive tape whose upper and lower surfaces are adhesive surfaces is used as the fixing member 14. Either the upper or lower surface comes into contact with the flexible printed circuit board 12, and the opposite surface has a portion that comes into contact with the frame 13 and a portion that comes into contact with the light guide plate 10, and thus the flexible printed circuit board 12, the frame 13, and the light guide plate 10 are fixed. Since the holes 13b are provided only in the vicinity of the connection portions 12d, and the fixing member 14 that fixes the flexible printed circuit board 12, the light guide plate 10, and the frame 13 extends to the fixing member contact face 10g of the light guide plate 10, when the pitch between the light sources 11 is shrunk, the fixing area of the fixing member 14 can be set large without interfering with the solder for connecting the light sources 11 to the lands on the flexible printed circuit board 12. This makes it possible to raise the fixing strength, and even if the connection portions 12d for connecting the light sources 11 and the flexible printed circuit board 12 are arranged so as to be accommodated in the holes 13b of the projection portions 13a, the electrical connections therebetween are not impaired.

Furthermore, the shape of the portion of the fixing member 14 for fixing the light guide plate 10 need only be an appropriately selected shape. It is possible to use a shape that conforms to the shape of the fixing member contact face 10g formed in the light introduction portion 10b of the light guide plate 10, and it is possible to further increase the area of the portion for fixing the light guide plate 10 in order to raise the fixing strength. Note that although Embodiment 1 describes the use of a sheet-like fixing member such as double-sided adhesive tape, there is no limitation to this, and the fixing member may be, for example, a generally-used hardening liquid type of adhesive, and the fixing member may be given a light shielding property.

Furthermore, the fixing member 14 may extend beyond the fixing member contact face 10g to the light guide plate main body portion 10a. Between the aligned light sources 11, the portions in which mixing occurs between light that was emitted from the light sources 11 and entered the light guide plate 10 are in the light guide plate plane, and the light intensity is locally high, and therefore there are cases where the uniformity of brightness in the light guide plate plane decreases, and the light emission quality of the planar light source apparatus 1 decreases. However, if the fixing member 14 extends to the light guide plate main body portion 10a in this way, it is possible to cover the portions in which the light intensity is locally high and the light emission quality decreases, thus making it possible to improve the quality of the planar light source apparatus 1.

The reflection sheet 15 of Embodiment 1 is a smooth sheet constituted by a white resin sheet having a high light reflection rate, a metal foil, or the like, and as shown in FIG. 3, the reflection sheet 15 is arranged on the lower surface of the light guide plate 10 so as to reflect light that has leaked out from the surface of the light guide plate 10 that is opposite to the inclined light exit surface, so as to return the light to the interior of the light guide plate 10, thus making it possible to improve the light use efficiency of the planar light source apparatus 1.

The diffusion sheet 16 of Embodiment 1 is a semi-translucent resin film for widening the directional characteristics of the illumination light by diffusing the light emitted from the light exit face 10d of the light guide plate 10. The prism sheets 17a and 17b are transparent resin films having a pattern of minute triangular prism shapes that extend in a specific direction on the upper surface. As shown in FIG. 3, the prism sheet 17a and the prism sheet 17b are overlaid, and are arranged such that the ridge lines of the triangular prisms in the respective patterns are orthogonal to each other in a view from above.

The light shielding sheet 18 of Embodiment 1 is a flexible black adhesive sheet whose upper and lower surfaces are both adhesive surfaces. As shown in FIG. 2, the light shielding sheet 18 is frame shaped. The light shielding sheet 18 can block light that has leaked out directly from the light sources 11 and light that has leaked out from the inclined face 10f of the light introduction portion 10b of the light guide plate 10, which are causes of brightness unevenness in the planar light source apparatus 1.

The following describes structures in the assembly of the planar light source apparatus 1 with reference to FIG. 3. FIG. 3 is a cross-sectional view of a portion of the planar light source apparatus 1 where a light source 11 is arranged.

As shown in this figure, the reflection sheet 15 is adhered to the lower surface of the frame 13 by double-sided adhesive tape (not shown), and the region below the opening formed by the frame 13 is blocked by the reflection sheet 15. The light guide plate 10 is housed in the frame 13 and placed over the reflection sheet 15. The light source 11 is housed in the frame 13 such that the light emission window 11a opposes the light entrance face 10e of the light guide plate 10. The fixing member 14 is arranged on the lower surface of the flexible printed circuit board 12, and thus the flexible printed circuit board 12, the frame 13, and the light guide plate 10 are fixed by the fixing member 14. The diffusion sheet 16 and the prism sheets 17a and 17b are then successively overlaid on the light exit face 10d of the light guide plate 10.

The light shielding sheet 18 is overlaid on the frame 13 from above the prism sheet 17a, and is adhered to the upper surfaces of the frame 13 and the flexible printed circuit board 12. As a result, the periphery of the upper surface side of the light guide plate 10, the diffusion sheet 16, and the prism sheets 17a and 17b is covered by the light shielding sheet 18, and the portion of the prism sheet 17a corresponding to the light emission region of the light guide plate 10 is exposed.

With the planar light source apparatus 1 assembled in this way, the light guide plate 10, the flexible printed circuit board 12, the light sources 11, the diffusion sheet 16, and the prism sheets 17a and 17b housed in the frame 13 are held between the light shielding sheet 18 and the reflection sheet 15.

With the planar light source apparatus 1 having this structure, light that enters the light introduction portion 10b through the light entrance face 10e is guided to the light guide plate main body portion 10a while being reflected by the upper surface and the lower surface of the light introduction portion 10b. Also, the light guided to the light guide plate main body portion 10a is guided within the light guide plate 10 while undergoing total reflection at the upper surface and the lower surface of the light guide plate 10, and thus spreads over the entirety of the light guide plate 10. Many minute optical shapes 10c having recessions and projections are formed on the lower surface of the light guide plate 10. For this reason, when the light guided within the light guide plate 10 is incident on the optical shapes 10c, it undergoes total reflection at the optical shapes 10c, and among the light beams that underwent total reflection at the optical shapes 10c, the light beams that were incident on the light exit face with an angle of incidence smaller than the critical angle of total reflection are emitted to the outside from the light exit face 10d.

The optical shapes 10c may have a semi-spherical or prism-shaped cross-section. The optical shapes 10c may protrude from the light guide plate 10, or be depressions therein. In this way, the directional characteristic of the light emitted from the light exit face 10d is relatively narrow, and therefore light is gently diffused by passing through the diffusion sheet 16, and the directional characteristic is widened. Furthermore, it is possible to curve the direction of the light by passing it through the prism sheets 17a and 17b such that the maximum brightness direction approaches a direction perpendicular to the light exit face 10d, thus making it possible to provide a planar light source apparatus 1 having a higher brightness.

In Embodiment 1 described above, the projecting projection portions 13a are formed on the inner surface of the frame 13 on the side where the light sources 11 are formed, and the holes 13b for accommodating the connection portions 12d of the flexible printed circuit board 12 are provided, thus making it possible to shrink the pitch between the light sources 11. For this reason, it is possible to raise the number of light sources that can be mounted on a flexible printed circuit board 12 having a specific length, thus making it possible to provide a planar light source apparatus 1 having a higher brightness.

Also, the planar light source apparatus 1 of Embodiment 1 is used in a display apparatus such as a liquid crystal panel, as described above. The planar light source apparatus 1 and the display apparatus of Embodiment 1 can be installed in various types of electronic devices. Examples of electronic devices in which the planar light source apparatus 1 and the display apparatus can be installed include, but are not limited to, a mobile phone, a smartphone, a tablet PC, and electronic book, a TV, a digital still camera, a wearable device, a car navigation apparatus, an electronic dictionary, and an electronic signboard.

Embodiment 2

Figure 8A:
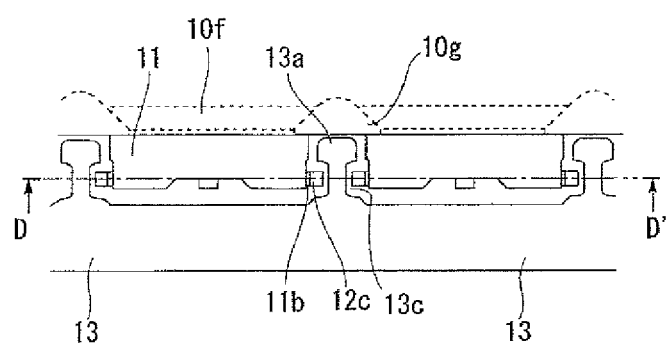
FIG. 8A is a top view of a light guide plate, light sources, and a frame according to Embodiment 2 of the present invention.
Figure 8B:
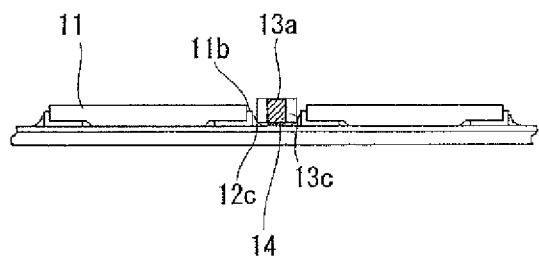
FIG. 8B is a cross-sectional view of the same taken along a line D-D'.

FIG. 8A is a top view of the light guide plate 10, a light source 11, and the frame 13 as viewed from the flexible printed circuit board 12 side, and FIG. 8B is a cross-sectional view taken along a line D-D' in FIG. 8A. Embodiment 2 is the same as Embodiment 1 with the exception of the difference that the holes 13b provided in the projection portions 13a of the frame 13 pass completely through the frame 13 in the thickness direction of the frame 13.

As shown in FIG. 8B, the thickness of the projection portions 13a is defined by the surface on the flexible printed circuit board 12 side and the opposite surface. In the vicinity of the connection portions 12d for connecting the flexible printed circuit board 12 and the light sources 11, holes 13c that pass completely through in the height direction are formed in the projection portions 13a such that these portions of the projection portions 13a have a smaller width than in the other portions as viewed in the direction of protrusion from the surface of the projection portions 13a on the flexible printed circuit board 12 side toward the opposite surface. In the portion where the holes 13c are formed, the cross-section of the projection portion 13a itself in a direction perpendicular to the protrusion direction of the projection portion 13a is shaped as a rectangle in which the width in the thickness direction of the projection portion is longer than the width in the direction perpendicular thereto. The inner walls of the holes 13c are constituted by multiple surfaces.

In this way, the holes 13c are formed in the projection portions 13a such that these portions of the projection portions 13a have a smaller width as viewed in the direction of protrusion from the surface of the projection portions 13a on the flexible printed circuit board 12 side, and therefore the connection portions 12d for connecting the flexible printed circuit board 12 and the light sources 11 are accommodated in the holes 13c formed in the projection portions 13a, thus making it possible to shrink the pitch between the light sources 11. Also, since the holes 13c are formed only in the vicinity of the connection portions 12d for connecting the flexible printed circuit board 12 and the light sources 11, the width of the frame 13 at the tips of the projection portions 13a can be set larger than the width of the portions in which the holes 13c are provided, thus making it possible to increase the area of the surfaces that come into contact with the projection portions 13a via the fixing member 14, and therefore the fixing strength of the planar light source apparatus 1 is raised. Also, since the holes accommodating the connection portions 12d pass completely through, it is possible to easily check the arrangement precision from the outside during assembly of the planar light source apparatus 1.

Note that the shape of the holes 13c passing completely through the projecting portions 13a need only be set such that the holes 13c are formed in the vicinity of the connection portions 12d for connecting the flexible printed circuit board 12 and the light sources 11, and this shape is not limited to the shape shown in the drawings. The shape need only be determined so as to conform to the positions of the connection portions 12d.

Embodiment 3

Figure 9A:
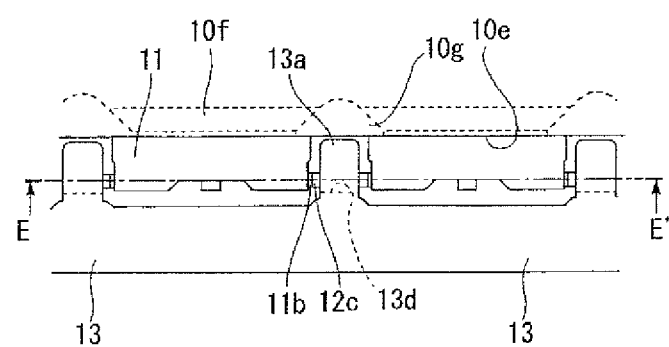
FIG. 9A is a top view of a light guide plate, light sources, and a frame according to Embodiment 3 of the present invention.
Figure 9B:
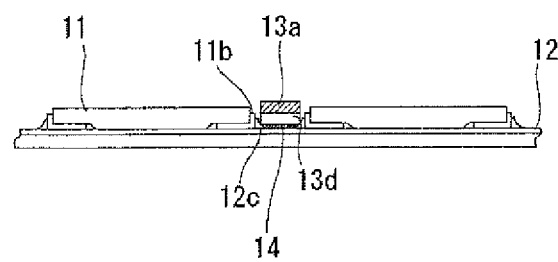
FIG. 9B is a cross-sectional view of the same taken along a line E-E'.
Figure 10A:
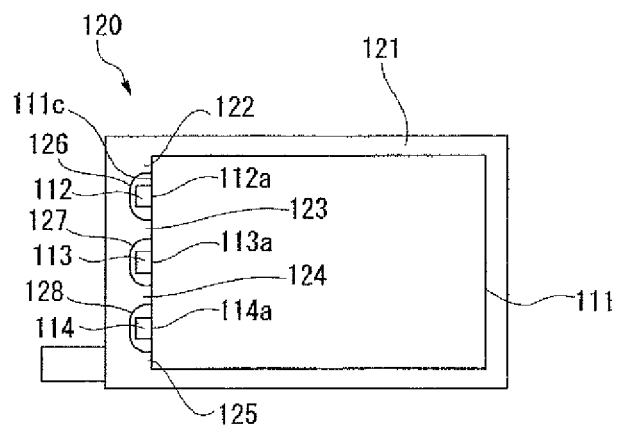
FIGS. 10A and 10B are front views of a planar light source apparatus according to a conventional example.
Figure 10B:
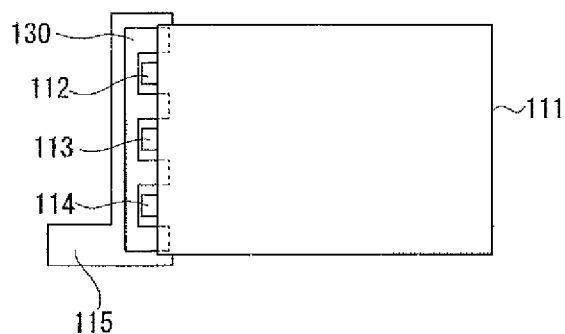

FIG. 9A is a top view of the light guide plate 10, a light source 11, and the frame 13 as viewed from the flexible printed circuit board 12 side, and FIG. 9B is a cross-sectional view taken along a line E-E' in FIG. 9A.

Embodiment 3 is the same as Embodiment 1, with the exception of the differences that the frame thickness of the surface of the frame 13 that opposes the light guide plate 10 at the tip of the projection portion 13a is smaller than the thickness of the light guide plate 10, and the fixing member 14 fixes only the flexible printed circuit board 12 and the frame 13.

As shown in FIG. 9A, multiple projection portions 13*a* that project toward the interior of the opening of the frame 13 are formed on the inner surface of the frame 13 on the side on which the light sources 11 are arranged. The light sources 11 are arranged between respective projection portions 13*a*, and the tips of the projection portions 13*a* oppose the light entrance face 10*e* of the light guide plate 10. A level difference 13*d* is formed at the tip of the projection portion 13*a* of the frame 13 such that this portion of the projection portion 13*a* has a reduced height from the surface of the projection portion 13*a* on the flexible printed circuit board 12 side as viewed in the projecting direction. In other words, as shown in FIG. 9B, the level difference 13*d* is formed on the flexible printed circuit board 12 side of the projection portion 13*a*. The level difference 13*d* is formed by cutting out a portion of the tip portion on the circuit board side, from the vicinity of the connection portion 12*d* of the flexible printed circuit board 12 toward the tip side of the projection portion 13*a*.

The connection portions 12*d* for connecting the flexible printed circuit board 12 and the light sources 11 are arranged so as to be accommodated in the level differences 13*d*. By providing the level differences 13*d* at the tips of the projection portions 13*a* in this way, it is possible to bring the light sources 11 as close together as possible without the presence of the frame 13 between the connection portions 12*d* for the aligned light sources 11. In Embodiment 3, the flexible printed circuit board 12 and the frame 13 are fixed by the fixing member 14. Although the fixing of the light guide plate 10 needs to be performed using a separate adhesive means in Embodiment 3, it is possible to increase the area of the surfaces of the flexible printed circuit board 12 and the frame 13 that comes into contact with the surfaces of the projection portion 13*a* via the fixing member 14, while being able to mount a large number of light sources 11 in a planar light source apparatus 1 having a certain width.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A planar light source apparatus comprising:
a light guide plate;
a light source arranged on a side face of the light guide plate;
a mounting substrate on which the light source is mounted; and
a frame body that holds the light guide plate,
wherein the frame body has a plurality of projection portions on an inner side of the frame body,
wherein the light source is arranged between the projection portions,
wherein the frame body, the mounting substrate, and the light guide plate are fixed via a fixing member,
wherein the light source has a pair of electrode terminals,
wherein the mounting substrate has a land portion on which the electrode terminals are mounted,
wherein connection portions are provided by which the electrode terminals and the land portion are electrically connected,
wherein the projection portions have a thickness defined by a surface on the mounting substrate side and an opposite surface relative thereto, and
wherein each of the projection portions is formed such that, in a cross-section of at least a portion of the projection portion viewed in a projecting direction of the projection portion in a vicinity of the connection portions, the height or the width of the projection portion is smaller than the highest height or the highest width of the projection portion from the surface of the projection portion on the mounting substrate side toward the opposite surface.

2. The planar light source apparatus according to claim 1, wherein a plurality of the light sources are provided, and
wherein, in each of the projection portions located between the connection portions, the width of the surface that comes into contact with the substrate via the fixing member is the smallest in the projection portion.

3. The planar light source apparatus according to claim 1, wherein each of the projection portions is formed such that, in a cross-section of at least a portion of the projection portion viewed in the projecting direction of the projection portion, only the width of the projection portion is smaller than the highest width of the projection portion.

4. The planar light source apparatus according to claim 1, wherein tips of the projection portions and the light guide plate oppose each other, and
wherein each of the projection portions is formed such that the width of a cross-section of the tip of the projection portion is larger than the cross-section of at least a portion of the projection portion as viewed in the projecting direction of the projection portion in which the highest height or the highest width of the projection portion is smaller than the highest width of the projection portion from the surface of the projection portion on the mounting substrate side toward the opposite surface.

5. The planar light source apparatus according to claim 1, wherein the height or the width of the projection portion at the tip of the projection portion is smaller than the highest height or the highest width of the projection portion from the surface of the projection portion on the mounting substrate side.

6. The planar light source apparatus according to claim 1, wherein as viewed in the projecting direction of the projection portions, at least a portion of a cross-sectional shape of the projection portions is T-shaped.

7. The planar light source apparatus according to claim 1, wherein as viewed in the projecting direction of the projection portions, at least a portion of a cross-sectional shape of the projection portions is trapezoidal.

8. The planar light source apparatus according to claim 1, wherein as viewed in the projecting direction of the projection portions, a portion of the contour of a cross-sectional shape of the projection portions includes a curved line.

9. The planar light source apparatus according to claim 1, wherein tips of the projection portions and the light guide plate oppose each other,
wherein the fixing member is arranged so as to span the projection portions and the light guide plate, and
wherein the thickness of the projection portions and the thickness of the light guide plate are the same thickness at the opposing surfaces.

10. The planar light source apparatus according to claim 1, wherein an area of each of the projection portions on the mounting substrate side is smaller than the area of the opposite surface relative thereto.

11. The planar light source apparatus according to claim 1, wherein an area of a shape of portions of the fixing member arranged over the projection portions is smaller than or equal to the area of the projection portions.

12. A display apparatus comprising the planar light source apparatus according to claim 1.

13. An electronic device comprising the planar light source apparatus according to claim 1.

14. The planar light source apparatus according to claim 2, wherein an area of a shape of portions of the fixing member arranged over the projection portions is smaller than or equal to the area of the projection portions.

15. The planar light source apparatus according to claim 3, wherein an area of a shape of portions of the fixing member arranged over the projection portions is smaller than or equal to the area of the projection portions.

16. The planar light source apparatus according to claim 4, wherein an area of a shape of portions of the fixing member arranged over the projection portions is smaller than or equal to the area of the projection portions.

17. The planar light source apparatus according to claim 5, wherein an area of a shape of portions of the fixing member arranged over the projection portions is smaller than or equal to the area of the projection portions.

18. The planar light source apparatus according to claim 6, wherein an area of a shape of portions of the fixing member arranged over the projection portions is smaller than or equal to the area of the projection portions.

19. The planar light source apparatus according to claim 7, wherein an area of a shape of portions of the fixing member arranged over the projection portions is smaller than or equal to the area of the projection portions.

20. The planar light source apparatus according to claim 8, wherein an area of a shape of portions of the fixing member arranged over the projection portions is smaller than or equal to the area of the projection portions.

* * * * *